D. Reynolds
Check Rein Holder.
No. 97,443.        Patented Nov. 30, 1869.

United States Patent Office.

DAVID REYNOLDS, OF ROCKFORD, ILLINOIS.

Letters Patent No. 97,443, dated November 30, 1869.

IMPROVED HOLDER FOR CHECK-REINS.

The Schedule referred to in these Letters Patent and making part of the same.

*To all whom it may concern:*

Be it known that I, DAVID REYNOLDS, of Rockford, in the county of Winnebago, and State of Illinois, have invented certain new and useful Improvements in Holders for Check-Reins, of which the following is a full, clear, and exact description.

The object of my invention is to provide a simple and efficient device, whereby the check-reins of a horse may be slackened at pleasure by the driver, without leaving his seat, thus enabling its strain to be relaxed, to allow the animal to lower his head, when desired for watering or other purposes; to which ends, My improvements consist in a novel combination of a pivoted lever with an adjustable arm, secured to a standard upon the saddle, the said lever carrying a hook, for the attachment of the check-rein, and adjustable terrets, through which the driving-lines pass, by which mode of construction, when the lever is raised, by means of the driving-lines, until the line of draught of the check-rein is above its point of connection to the bearing-arm, it (the lever) will be swung forward, and the check-rein correspondingly relaxed by the horse, in lowering his head.

In the accompanying drawings, which show a convenient arrangement of parts for carrying out the objects of my invention, my improvements are represented as applied to single driving-harness of the ordinary description, but they are equally applicable to double harness.

Figure 1:
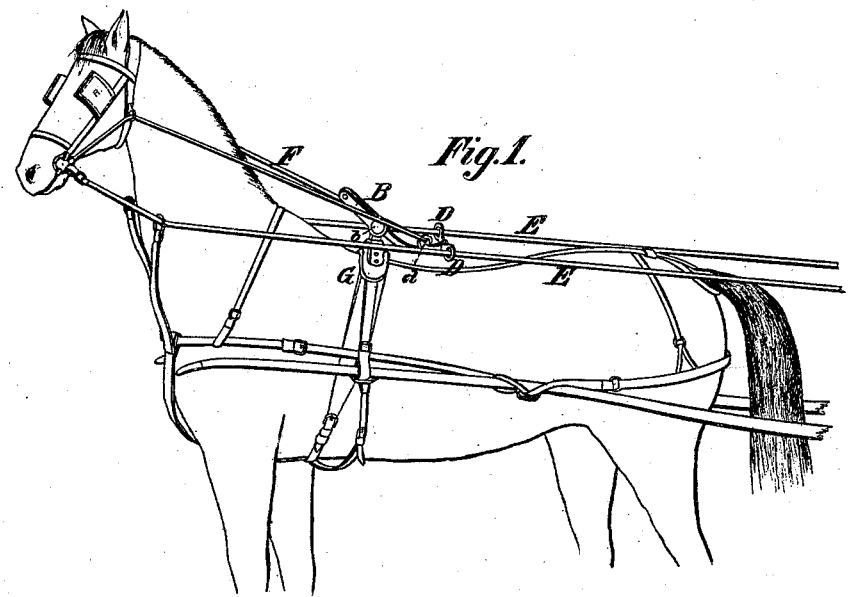
Figure 3:
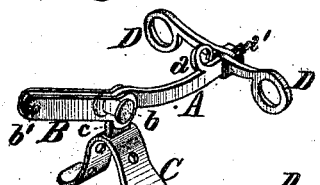
Figure 2:
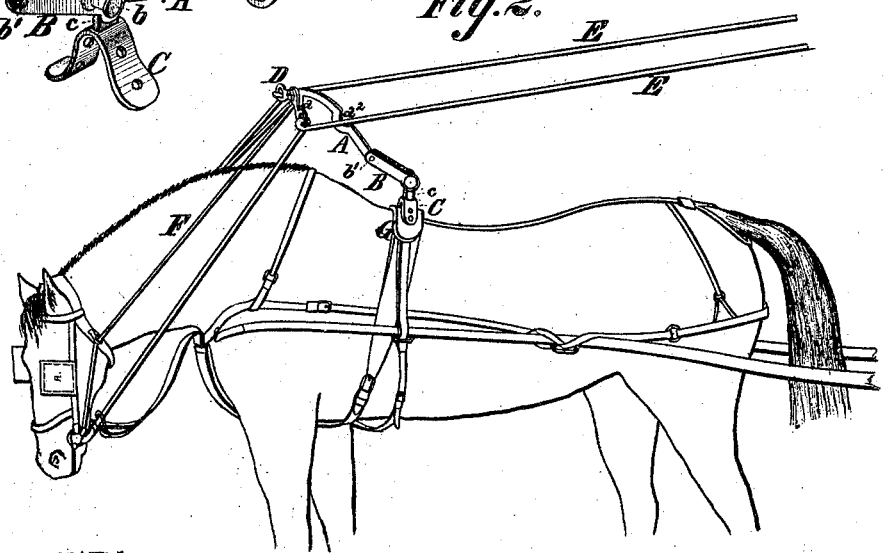

Figure 1 is a view in perspective of my improved device, applied to a set of single harness, the parts being in the positions they occupy when the horse's head is checked up for driving;

Figure 2, a similar view of the same, when the horse's head is lowered;

Figure 3, a similar view of the same, detached from the harness; and

Figure 4:

Figure 4, a view in elevation of the lever which carries the check-rein hook and terrets.

A double or bifurcated bearing-arm, B, is secured, at its rear end, by the bolt $b$, to a standard, $c$, upon a plate, C, which, in turn, is firmly fastened to the saddle G, or the standard may be attached directly to the saddle, if preferred.

The arm B is inclined forward and upward, as shown in the drawings, and may have its position regulated, by means of the bolt, so as to stand at a greater or less angle, as required, for the purpose of adjusting it by relation to the horse's head, and maintaining its forward end above the line of draught of the check-rein.

A lever, A, is pivoted, by a pin or bolt, $b'$, to the forward end of the arm B, and extends rearward, carrying a hook, $a$, near the rear end, to which the check-rein F is connected, the arm B being so adjusted that the line of draught of the check-rein is below the centre of the pin or bolt $b'$, thereby holding the lever A in position, and keeping the check-rein tight, and the horse's head elevated, as shown in fig. 1.

The lever A terminates in a screw-bolt, $a'$, upon which the terrets D, through which the main driving-lines pass, are adjustable, so as to be raised or lowered, to suit the position of the driver, and are made fast, as desired, by a nut.

A notch or recess, $a^2$, is formed in the lower side of the lever A, to enable the same to clear the bolt $b$, when in the position shown in figs. 1 and 3.

The operation of the device is as follows:

The parts being in the position shown by fig. 1, and the height of the standard and angle of the bearing-arm being such that the line of draught on the check-rein shall be below the centre of the bolt $b'$, it will be seen that the strain of the horse upon the check-rein tends to hold the lever firmly in position, and keeps the check-rein tight, and until the line of draught of the check-rein is elevated above the centre of the bolt $b'$, the lever cannot be raised by the horse, and has no tendency to leave its position, being kept therein by its own gravity.

When it is desired to slacken the check rein, for the purpose of watering or feeding the horse, &c., the driver raises the driving-lines E, thereby raising the line of draught of the check-rein above the centre of the bolt $b'$, and permitting the horse to lower his head, by swinging the lever forward upon the bolt.

The terrets then being in an inverted position, the driving-lines make a half hitch in them, which prevents them from drawing through, and enables the driver to tighten the check-rein at pleasure, by bringing the lever back to its original position.

A stop may be placed upon the bearing-arm, to limit the range of movement of the lever, if deemed necessary.

It will be seen that my improvement is of simple construction and operation, and can be readily applied to harness of the ordinary construction.

For double harness, it is only necessary to use a single terret on each set of harness, and a single rein will operate the device equally well.

I do not confine myself to the precise construction and attachment of the parts herein described, as it is obvious that the same may be modified in various ways, without affecting the principle of my invention.

What I claim as new, and desire to secure by Letters Patent, is—

1. A lever, supporting the terret-bar, when pivoted above the line of the draught of the check-rein, and operated by means of the driving-rein, in the manner described, for the purpose set forth.

2. The device described, consisting of the lever A, bearing-arm B, standard $c$, and terret-bar D, when combined as described, for the purpose set forth.

In testimony whereof, I have hereunto signed my name.

DAVID REYNOLDS.

Witnesses:
G. W. FORD,
E. A. NICHOLS.